Feb. 10, 1959
R. H. MERRICK
2,873,140
LIQUID DISTRIBUTION SYSTEM
Filed March 31, 1954
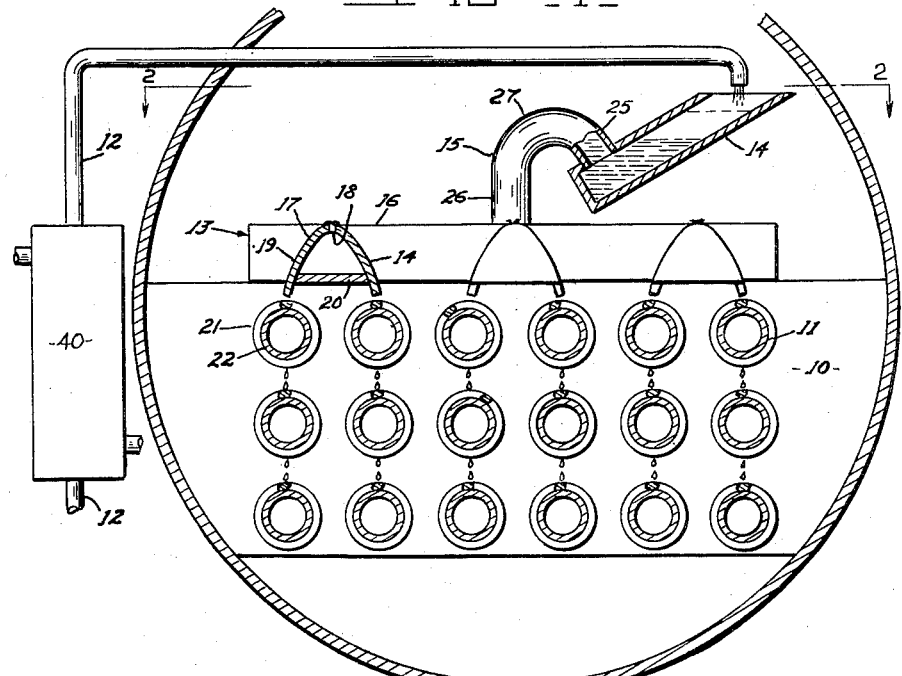
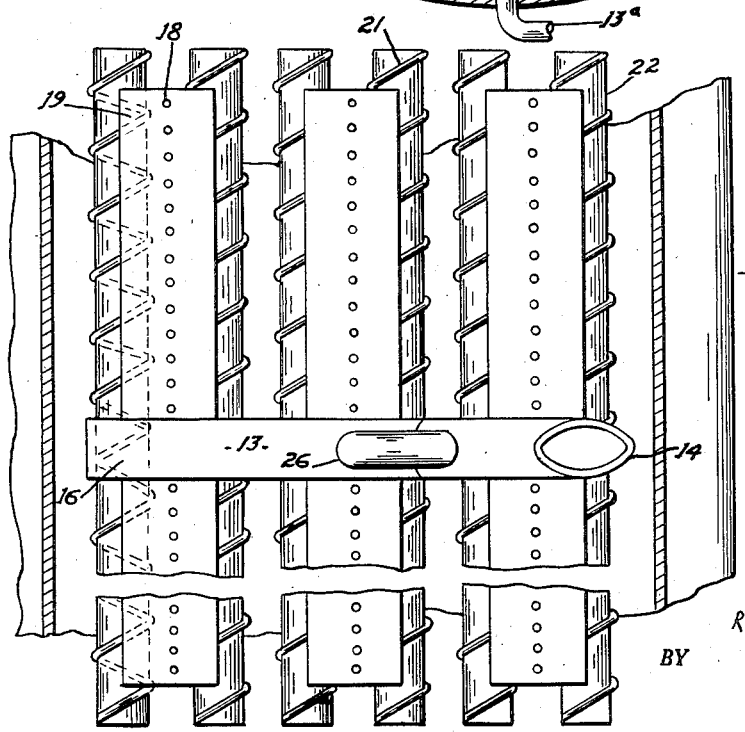
INVENTOR.
Richard H. Merrick
BY Herman Seid
     Atty.

Feb. 10, 1959 R. H. MERRICK 2,873,140
LIQUID DISTRIBUTION SYSTEM
Filed March 31, 1954 2 Sheets-Sheet 2
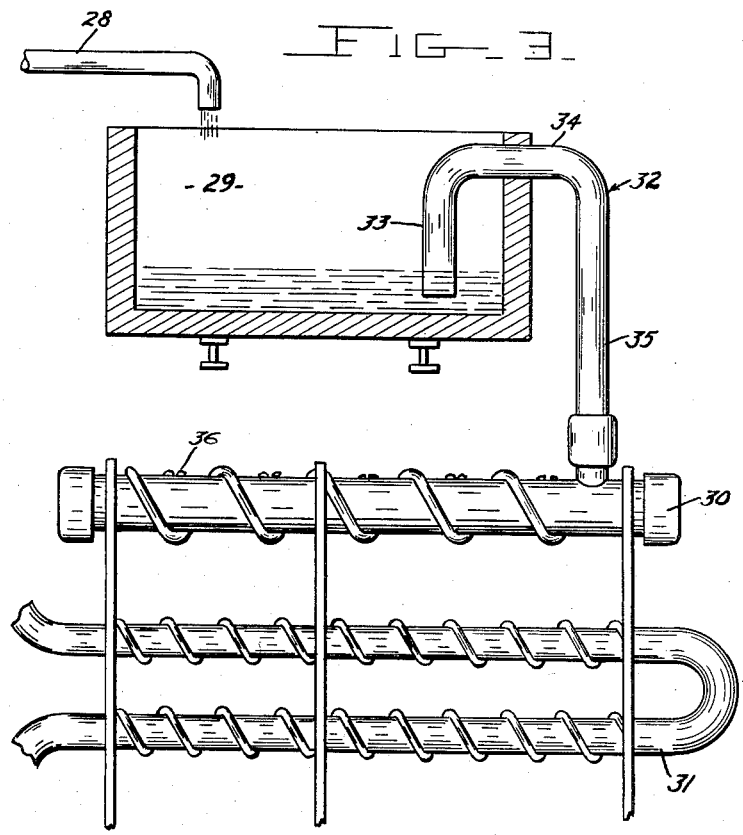
INVENTOR.
Richard H. Merrick
BY Herman Seid
atty.

United States Patent Office 2,873,140
Patented Feb. 10, 1959

2,873,140

LIQUID DISTRIBUTION SYSTEM

Richard H. Merrick, East Syracuse, N. Y., assignor to Carrier Corporation, Syracuse, N. Y., a corporation of Delaware Application March 31, 1954, Serial No. 419,960

1 Claim. (Cl. 299—25)

This invention relates generally to liquid distribution systems and more specifically to an arrangement for supplying liquid to heat transfer devices where it is necessary to distribute relatively small quantities of liquid over a relatively large surface area of a heat exchange unit.

The invention is particularly suitable for use in the absorber of a conventional absorption refrigeration system where water is used as a refrigerant and a solution such as lithium bromide is employed as an absorbent. In the absorber, the absorbent is introduced in a relatively concentrated solution into the absorber and therein becomes more dilute by absorbing water vapor. The vapor, previously formed in the evaporator of the refrigeration system is absorbed by the liquid solution which is cooled by the cooling coil. The liquid absorbent, in order to obtain efficient dilution, is cooled by being dispersed over the coil containing the cooling medium therein.

The cooled absorbent condenses the vapor and the solution gravitates to an outlet in the bottom of the absorber. It is highly desirable to introduce the absorbent over the tubes of the coil by feeding quantities of the absorbent into engagement with a helical wire wound about the tube so that the absorbent spreads, in film form, over the areas of the tubes between the turns of wire.

In the past the liquid absorbent has been collected in a receiver from where it has drained by gravity through a plurality of restrictions such as orifices or capillary passages so that the equality of distribution has depended upon uniform heads imposed on each restriction. Distribution systems of this type necessarily require restrictions having an opening of a size sufficient to prevent clogging. However, when the openings are of the order required the system becomes sensitive to minor variations in a level disposition of the receiver due to the differences in the head accompanying the variations. This situation prevents the equality of distribution desired.

In order to provide an arrangement for the more efficient distribution of the absorbent over the cooling coil in the absorber this invention contemplates a system of liquid dispersion responsive to a continuous series of intermittent applications of force upon a partially confined body of the liquid so that quantities of the liquid are caused to escape from the body periodically. The application of force is preferably administered by collected quantities of the liquid which periodically displace the liquid forced from the partially confined body. This particular ram-like type of force application causes the liquid to gush out through openings in the top surface of the confining member. Any obstructions such as foreign matter that may have become lodged in the openings are removed in the stream of liquid. Such a system further overcomes to a great extent the problem created by minor variations in the level of the receiver.

One manner of producing the desired action is through the use of a siphon action to effect the ram-like force or pulsation which supplies the force necessary to periodically emit quantities of the liquid absorbent from the confining member into the desired engagement with the cooling coils. It is accordingly an object of this invention to provide an improved liquid distributing apparatus of the type used to supply small quantities of liquid to the surface of a body so as to obtain a film like surface contact with the body wherein the dispersion action is intermittent.

Another object of the invention is to provide an apparatus as described that causes the liquid to be dispersed onto the tubes by subjecting a quantity of the liquid to a ram-like action derived through the application of a siphon action in the liquid circuit above the dispersion means.

Other objects and advantages of the invention will be apparent upon a consideration of the ensuing specification and drawings wherein certain forms of the invention are disclosed for the purposes of illustration and are not to be interpreted in a limiting sense.

Figure 1 is a diagrammatic view of a portion of an absorber of an absorption refrigeration system showing a liquid distributing device illustrating the invention;

Figure 2 is a plan view of the system shown in Figure 1 along lines 2—2 of Figure 1; and Figure 3 is an enlarged fragmentary view of a portion of one of the vertical cooling coils in the absorber showing another form of the liquid distribution system.

Briefly one embodiment of the invention consists of a liquid distribution system including a receiver for collecting liquid absorbent as it enters the absorber in concentrated form, a dispersion unit including at least one distribution pipe and a header, and a connecting pipe, constructed so as to create a siphon action, joining the receiver and the dispersion unit.

Referring to Figure 1 there is shown a portion of an absorber 10 including a cooling coil 11, an inlet line 12 for supplying liquid absorbent in concentrated form to the absorber, a liquid distribution system generally designated 13 and an outlet 13a for permitting the mixture of absorbent and condensed vapor to flow into the weak solution line of the refrigeration system.

The term "weak solution" in this instance referring to a solution rich in refrigerant so that it is weak in absorbing properties and the term "strong solution" as used in this description refers to a solution deficient in refrigerant so that it is strong in absorbing characteristics.

The liquid absorbent flows into a receiver 14 and accumulates therein. A connecting line 15 permits the liquid to flow to a header 16, spaced below the receiver, from where it flows into tubes 17 which communicate with opposed openings in the header. The tubes 17 are provided in their top surface with a plurality of spaced openings 18. The sides 19 of the tubes 17 slope downwardly from the top beyond the substantially flat bottom 20 of the tube for a purpose to be later described. The lowermost end of each sloped side 19 of the tubes 17 is in contact with a helical coil of wire 21 wound tightly about the uppermost tube 22 of a vertical bank of tubes, each of which has a similar coil of wire 21 assembled about the outer surface. The tubes 22 comprise the cooling coil 11 of the absorber.

Referring once again to the connecting line 15 it will be noted that the line has a first leg portion 25, the end of which is connected to the receiver and a second leg portion 26 the end of which is connected to the header 16. Connecting the two legs 25 and 26 is a bent portion 27. When the liquid accumulates in the receiver 14 to a level where the bent portion of the tube is full of liquid, it will be obvious that a siphon action will occur, and continue until the level of liquid in the receiver falls below the connection between leg 25 and the receiver. The rate of discharge through the connecting line 15 is greater than the rate at which liquid flows into the receiver from line 12.

When the header 16 and pipes 17 are full of liquid, the force represented by the liquid being introduced into the header by the siphon action will cause liquid to be ejected from the pipes through the openings 18 in the form of a gush which will descend on the outer surface of sides 19 and flow in a film-like manner down the sides and onto the coils of wire on the tubes of the cooling coil. The film of liquid tends to flow onto the surface of the tube between the turns of wire. The liquid then drains down to the next tube in the cooling, usually in the form of droplets, and the process is repeated. The sloping sides 19 prevent any of the liquid from adhering to the bottom surface 20 of the tube and so provide an efficient means for guiding the liquid to the surface of the uppermost cooling coil.

The tubes 17 are provided with a particular configuration designed to overcome or minimize the disadvantages due to variations in leveling the tubes. As shown in Figure 2 the cross section of the tube is substantially triangular in shape, with the angle defined by the intersection of the sloping sides 19 disposed at the top of the tube. In the event the tubes are not exactly level, it will be obvious that liquid within the tubes will flow out of the openings 18 on the lower portion of the tube and a certain area within the tubes on the higher level will not contain any liquid, the area under consideration being proximate the openings 18. Therefore, to obtain equal distribution of the liquid from the member 17, first the area will have to be filled before liquid will emerge from openings 18. With the construction disclosed the area to be filled is maintained at a minimum.

Thus it will be evident that the pulsating type of pressure applied by the siphon action to the liquid in the dispersion tubes provides a systematic and complete distribution of the liquid absorbent onto the surfaces of tubes of the cooling coil.

Another form of the invention is illustrated in Figure 3 wherein there is shown inlet line 28 adapted to supply receiver 29 with the liquid absorbent, a dispersion tube 30 spaced below the receiver and above a vertical bank of tubes 31 of the cooling coil of an absorber, and a connecting line 32 having a short leg 33 extending within the receiver and spaced from the bottom thereof, a bent portion 34 projecting through an opening in the wall of the receiver and a long leg 35, the end of which is connected to the dispersion tube 30. In this form the dispersion tube has a coil of wire assembled about the outer surface thereof and further has openings 36 in the top surface thereof. The operation of this form is similar to the operation of the form illustrated in Figures 1 and 2 wherein liquid is periodically introduced into the dispersion tube in a manner to cause the liquid in the tube to be ejected therefrom in the form of a gush and to spread about the surface of the tube where it gravitates to the tubes of the cooling coil in the manner described.

In using either form of the invention it will be apparent that the advantages derived from the use of large openings in the prior art construction are present without the disadvantages of the possibility of uneven distribution. It is the particular impulse type of force application that permits this situation. The time interval between the intermittent impulses may be varied by design, as well as the pattern of distribution to obtain the desired results.

Although the invention has been described by illustrating the ram-like action of the liquid responsive to a siphon other arrangements capable of delivering the desired type of force will suggest themselves to those skilled in the art. The particular siphon action disclosed permits an efficient application of the force and further, by lengthening the leg connected to the distribution header or tube, provides an acceleration to the mass of liquid en route to the header.

In some instances it may be desirable to cool the absorbent entering the absorber by passing it in heat exchange relation with a cooling coil 40. This will prevent the liquid from flashing off or vaporizing under the varying conditions of pressure attending the siphon action, because the liquid will be cooled to a temperature below its boiling point for the pressures involved. As stated above it is not my intention to limit the use of the liquid distribution system forming this invention to use in an absorber of an absorption refrigeration system. Other uses within the spirit and scope of the invention will be obvious.

I claim:

A distribution system for liquids comprising dispersion means including a tube having at least one restricted discharge opening in an upper portion thereof, a supply pipe operatively connected to said dispersion means in substantially the same plane therewith, a liquid receiver above said dispersion means and having a pipe of inverted U form operatively connected at one end to a lower portion of said receiver and at the other end to said supply pipe, whereby when liquid is introduced to said receiver the same will flow, through said supply pipe and dispersion means by siphoning action.

References Cited in the file of this patent

UNITED STATES PATENTS

| | | |
|---|---|---|
| 998,930 | Tait | July 25, 1911 |
| 1,078,995 | Chase | Nov. 14, 1913 |
| 1,993,129 | Baird | Mar. 5, 1935 |
| 2,615,686 | Davidson | Oct. 28, 1935 |
| 2,298,029 | Blomquist | Oct. 6, 1942 |